United States Patent [19]

Chiu et al.

[11] 4,042,728
[45] Aug. 16, 1977

[54] VINYL MODIFIED LIGNOCELLULOSIC PARTICLES FOR COATING PANELS

[75] Inventors: Shui Tung Chiu, New Westminster; Tatsuhei Kaneko, Vancouver, both of Canada

[73] Assignee: Borden, Inc., Columbus, Ohio

[21] Appl. No.: 639,327

[22] Filed: Dec. 10, 1975

[51] Int. Cl.² .................. B05D 3/10; B05D 7/02; B05D 1/18
[52] U.S. Cl. ................................. 427/212; 427/303
[58] Field of Search .................. 427/212, 303; 8/115.6

[56] References Cited

U.S. PATENT DOCUMENTS

| | | |
|---|---|---|
| 2,817,617 | 12/1957 | Rogers .............................. 427/212 X |
| 3,083,118 | 3/1963 | Bridgeford .......................... 428/375 |
| 3,265,644 | 8/1966 | Herman et al. .................. 427/212 X |
| 3,494,826 | 2/1970 | Scheiber ........................ 427/391 X |
| 3,533,725 | 10/1970 | Bridgeford ..................... 427/393 X |

*Primary Examiner*—James R. Hoffman
*Attorney, Agent, or Firm*—Daniel D. Mast; George P. Maskas; George A. Kap

[57] ABSTRACT

Vinyl modified lignocellulosic particles are made by polymerization of vinyl monomer on substrate lignocellulosic particles. An improved initiator for the in situ polymerization such as sulfoxy compounds is provided. Over a wide range of add-on ratio of vinyl polymer to lignocellulosic particles, coatings for panels can be produced which have neither the solvent sensitivity of the polymer nor the water sensitivity of the cellulose.

5 Claims, No Drawings

VINYL MODIFIED LIGNOCELLULOSIC PARTICLES FOR COATING PANELS

BACKGROUND OF THE INVENTION

This invention relates to an improved process for producing a glossy, tough, optionally smooth surface on a lignocellulosic panel such as wood, plywood, fiberboard or particleboard.

Untreated surfaces of conventional plywood, fiberboard, or particleboard, as indeed those of solid wood itself, are known to have low resistance to abrasion and to be prone to dimensional change on contact with moisture. Such dimensional changes involve local areas of relative swelling and shrinking resulting in visual deficiencies which are known as face checking, grain raising and the like. Thus, the surfaces of particleboards and fiberboards may sometimes have low decorative value even though they are not made unsightly by too many knots or knotholes.

Various methods have been used conventionally to provide coatings for panels with the purpose of overcoming some of the aforementioned surface deficiencies. Various types of paints, varnishes, lacquers and the like have been used. In particular among these, amino modified alkyd resin compositions with solvent and optionally with pigment have been applied by spraying or roller coating and then even treating to evaporate the solvent and cure the polymer to provide a baked enamel finish. Such finishes are sometimes poor in wearability and in resistance to solvents and chemical stains. The evaporation of organic solvents during application in drying causes an air pollution problem. Furthermore, unless the panel surface is first smoothed by a sanding procedure, the surface roughness is telegraphed to the surface of the baken enamel finish and the enamel surface has an exaggerated roughness which is a replica of the roughness of the original panel.

When conventional oil paints or varnishes are used, the improvement in appearance is only temporary. Even with up to five successive coats, the barrier in moisture may not be sufficient to prevent eventual distortion due to swelling and shrinking of the panel.

A type of surfacing known as overlay is accomplished by first treating a fibrous web such as paper or cotton fabric with a synthetic polymer of either the thermosetting or thermoplastic type and then laminating the treated web to the substrate panel. Alternatively, thermoplastic films have been used as overlays. When paper treated with melamine formaldehyde and/or phenol formaldehyde thermosetting resin is used as a overlay, improved wearability and resistance to stains and solvents are obtained. However, for best results in laminating thermosetting resins, high pressures of up to as high as 1200 psi are required. This high pressure has a side effect of tending to break down the internal bonds of the panel substrate. Furthermore, in order to obtain a uniform surface, the platen should be cooled to about 50° C under pressure after each heating cycle.

A fibrous type overlay was disclosed by Brant [Forest Products Journal 18 (5): 51-58 (1968)] using mechanical wood fibers that were precoated with a thermosetting resin. The resin bound fibers were applied as a mat which had a short duration of precuring stability. The direct application of dried phenolic resin polymer on the board surface together with wood fibers followed by hot pressing has also been tried. The aforesaid high curing pressure and repeated cooling cycles were still necessary using this approach.

Vinyl-modified lignocellulosic paper as a top layer for cylinder board is disclosed in U.S. Pats. Nos. 3,194,727 and 3,395,070.

Corresponding use of thermoplastics in resin paper overlays also has had several disadvantages. The requirement of high alpha-cellulose pulp or paper makes such a procedure expensive. The tackiness of polyester treated papersheet requires the extra complication of using cellophane separaters in handling. Paper overlays made with acrylic latices have had deficiencies in heat stability and resistance to organic solvents, even when the ratio of acrylic polymer to cellulose was limited to not more than 30%. In order to obtain a smooth, glossy surface, the platen must not be removed, after hot pressing, until it has been cooled to a temperature below the glass transition temperature of the impregnated thermoplastic polymer.

No known practicable method had been proposed whereby a particulate composition comprising cellulosic or wood particles merely admixed with thermoplastic polymer particles could be used successfully to prepare a smooth, glossy, tough surface on a wood base panel and in particular without the necessity of repeated cyclic cooling of the platen to a temperature below the glass transition temperature of the thermoplastic-polymer until a co-pending application having Ser. No. 503,640 was filed on Sept. 6, 1974, now abandoned.

That application discloses a method of applying on the surface of a lignocellulosic panel a conventional resin adhesive, spreading thereon vinyl modified lignocellulosic particles made by polymerization of the ethylenically unsaturated monomers on substrate lignocellulosic particles, and subjecting the assembly to heat and pressure to form a coated panel. The preferred method of hot pressing used a platen or cual plate. A good method for preparing vinyl-modified lignocellulosic particles is a development of the process disclosed in U.S. Pat. No. 3,083,118, whereby reaction sites in and on said particles are created by deposition of reductant ions like ferrous ion in or on the particles. The reductant treated particles are slurried in the water which is substantially free of reductant ions and the subsequent addition of vinyl monomer free radical donating initiator results in a vinyl polymerization limited substantially to in situ polymerization on the particles containing the reductant ions. The thus treated particles are then separated from the aqueous phase and dried.

Several methods, mainly chemical and high energy radiation methods, are known for preparation of vinyl polymer and cellulosic grafted copolymer. These methods have been extensively reviewed by Ward, Kyle, Jr. (graft polymerization onto cellulose in Chemical modification of paper making fibers, pages 167 to 215, Marcelle, Dekker, Inc., New York). These methods are usually very sensitive to lignin and phenolic extractives of lignocellulose and the oxygen present in the reaction system. The vinyl polymer and lignocellulose grafted copolymers are usually more resistant against organic solvents and heat than the composites prepared by previously described methods; but graft copolymers are rather poor in molding properties and some of the physical properties of the molded products are not acceptable. For example, the hot pressed plastic sheet of methyl methacrylate grafted, ground woodpulp is very brittle and very poor in impact resistance.

SUMMARY OF THE INVENTION

It is an object of the present invention to make desirable vinyl polymer and lignocellulosic composites of which the polymer deposited in or on fiber cell walls is mostly homopolymers and only a small portion (10–30%) is grafted onto lignocellulose chains. The grafted portion is determined by polymer solvent soxhlet extraction method (24 hours soxhlet extraction). In addition, the polymer add-on reaction is carried forth in aqueous medium. The polymer and lignocellulose composites made by this invention possess good molding properties, good water resistence, and dimensional stability.

The most desirable add-on polymerization calls for an aqueous medium which is one of the cheapest ones, low energy, short reaction time, and should be a simple process. In addition to all these things, the polymerization efficiency should be high. The present invention satisfies all these requirements. This was made possible by discovering the fact that oxidizable sulfoxy compounds can efficiently initiate polymerization of olefinically unsaturated monomers in cooperation with the metallic ions which are absorbed in the fibers so that the produced polymers are intimately deposited within and on the fiber cell walls. The polymers deposited in this manner are considered to have chances of partially forming graft copolymers with cellulose.

The use of oxidizable sulfoxy compounds in combination with metallic ions as an initiator of polymerization is disclosed in UK Pat. No. 582,327. The metallic ions described in this patent are copper, chromium, iron, cobalt and magnese; and they are known to accelerate oxidation of sulfoxy compounds. However, the idea of adapting this polymerization and initiating method to an add-on polymerization is believed to be new. In particular the major part of polymerization in our invention is expected to take place in and on the fiber cell walls of the lignocellulosic material with the aid of the metallic ions firmly absorbed there by the specific conditions of the application and the conditions maintained during polymerization. For example, in the case of using sodium dithionite which is the preferred oxidizable sulfoxy compound, the pH value of the reaction system is adjusted in two stages. This is done since the suitable pH range for metallic ion absorption in and on the lignocellulosic material is not the required pH at which polymerization is to be conducted. Hence, the pH of metallic ion treated lignocellulosic material must be readjusted to the range which is most favorable to polymerization. Fortunately, this pH readjustment does not cause disorption of the metallic ion from the lignocellulose.

The free metallic ions in the aqueous medium cause the formation of homopolymers; hence, the addition of metallic ions should not exceed the necessary amount just sufficient for starting polymerization. Nevertheless, some homopolymer growth is practically unavoidable. These homopolymers, however, can be easily and firmly precipitated with a trace of calcium chloride on the composite of vinyl polymer and lignocellulose prepared by the method of this invention.

The invention is related to a method of preparing vinyl polymer and lignocellulose composites by "in situ" polymerization in an aqueous medium with the initiation system in which oxidizable sulfoxy compounds such as dithionites, metabisulfites, or sulfites, participate in cooperation with metallic ions. Selection of the metallic ion depends on the oxidizable sulfoxy compound being employed. For example, dithionites are used in combination with copper ions while metabisulfites are used with either copper or iron ions.

In this process, the aqueous solution of metallic ions is absorbed in the lignocellulosic material; for example wood pulp, under such a condition that the metallic ions are most efficiently absorbed on the fibers. The treatment of lignocellulosic material with metallic ions is simply practiced by dispersing the lignocellulosic material into the metallic ion aqueous solution having proper pH and temperature. Then the pH of the lignocellulosic material slurry is readjusted to a higher value so that the sulfoxy compound which is to be added next will not be decomposed too fast. Vinyl monomer and the sulfoxy compound are added to the slurry in this order or simultaneously. During the reaction, the mixture is continuously stirred at a moderate temperature of about 50° C. The metallic ions accelerate the oxidation of sulfoxy compound to generate radical ions which initiate polymerization of the polymer in and/or on the fibers.

The advantages of the improved methods of the present invention are:

1. Low reaction temmperature and high polymerization rate, the polymerization of methyl methacrylate onto bleached kraft pulp and groundwood pulp initiated with dithionite in cooperation with copper ions can be completed within one hour at 45° C. The graft copolymerization method described in U.S. Pat. Nos. 3,083,118 and 3,533,725 where polymerization is initiated by hydrogen peroxide in cooperation with ferrous ions requires higher temperatures (70°–80° C).

2. The polymerization is not inhibited by wood lignin content whereas other add-on polymerization methods such as the cerium method (U.S. Pat. No. 3,046,078 and Canadian Pat. No. 667,609) are very sensitive to wood pulp lignin content. For example, cerium ions cannot initiate polymerization of methyl methacrylate onto spruce groundwood pulp.

3. The present polymerization method is not sensitive to oxygen which exists in the reaction medium (water). The aforementioned hydrogen peroxide method and cerium ion method are strongly inhibited by oxygen.

4. The polymers deposited by this method are more homogeneously distributed onto wood pulp than those prepared by mechanical mixing of polymer and wood pulp such as by beater addition (U.S. Pat. No. 2,658,828 and Canadian Pat. No. 763,202).

5. This is a non-organic solvent system. It is superior to the polymer solution impregnation method (U.S. Pat. No. 3,494,826).

6. The polymer and lignocellulosic composites prepared by this method can be converted to a foam-like material which is easily formed into a mat of uniform thickness and density. As an example, 120% polymethyl methacrylate deposited spruce groundwood pulp (ratio of polymer to pulp) initiated by sodium dithionite in cooperation with copper ions, is converted to a foam-like material simply by vigorously agitating the polymer and pulp composite slurry of 5% consistency (solid to water ratio) by using a blender. Then a uniformly thick mat is made by spreading the foam-like material in a deckle box. The mats are intermediate products that can be used to make plastic sheets.

7. Plastic sheets made of the polymer and pulp composite initiated by this method are more flexible than those made by above-mentioned graft copolymerization methods. For example, relatively flexible sheets were made of 120% methyl methacrylate polymer deposited spruce groundwood pulp initiated by sodium dithionite in cooperation with copper ions by using 40 gram/ft.² material and hot-pressing at 250 psi and 340° F for five minutes. The plastic sheets were very brittle when methyl methacrylate polymer deposited groundwood pulp was initiated by hydrogen peroxide in cooperation with ferrous ions.

8. Plastic sheets produced by hot-pressing the methylmethacrylate deposited groundwood pulp are especially suitable for concrete form linings. The plywood concrete from overlaid with this plastic sheet can be reused for over 40 times; while bare plywood concrete forms can be reused only 6–8 times even though they are oiled before every use.

9. A mat or powder of the polymer and wood pulp composite made by these methods can be laid upon a pre-formed wood particleboard mat and hot-pressed to make a coated particleboard in a single step.

10. Dyestuffs can be substantive to either the polymer or the lignocellulose part of the composition or both.

11. The polymer deposited lignocellulose prepared by this method can be used as molding materials or plastic fillers.

PREFERRED METHODS OF THE INVENTION

Chemical, semichemical and mechanical (groundwood) pulps are the preferred lignocellulose fibrous materials.

The selection of the metallic ion (accelerator) to be used depends on the particular oxidizable sulfoxy compound used. The preferred initiation systems are dithionites used in combination with copper ions, metabisulfites and sulfites used with copper and iron ions.

Water-soluble and stable dithionite salts, such as sodium and zinc dithionites may be used. Similarly, sodium and potassium metabisulfites or sulfites may be used.

Copper ions in the form of water-soluble, inorganic or organic salts such as copper sulfate and copper acetate are very suitable. Similarly, iron ions can be those supplied by solutions of ferrous sulfate, ferrous chloride, ferrous ammonium sulfate, ferrous acetate, ferric sulfate and ferric chloride.

The vinyl monomers preferably have the following chemical structure:

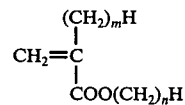

m, n ≧ 1

Methacrylate esters such as methyl, ethyl and butyl methacrylates are the most desirable monomers.

The monomer and wood pulp add-on polymerization is preferably carried out in an aqueous medium. In order to obtain a sufficient agitation, the pulp to water ratio (consistency) is preferred to be 0.01514 0.025.

The most desirable copper and iron ion concentrations are 0.7–1.5 milli mol/liter based on the aqueous portion of the pulp slurry.

The treatment of pulp with metallic ions can be carried out by immersing the pulp in the metallic ion aqueous solution for a certain period of time, preferably 5 minutes or more, at a pH of from 5.0–6.0. Continuous agitation of the pulp slurry will be helpful for more uniform absorption of the metallic ions by the pulp. The higher the slurry temperature, the better the metallic ion absorption is expected to be. However, it will be convenient to keep the temperature at from about 45° –55° C taking into account the cooking temperature which is to be utilized.

The preferably sulfoxy compound concentration is between 1.5 and 3.0 milli mol/liter in the case of dithionites, or between 2.0 and 2.5 milli mol/liter if metabisulfite or sulfite is used. The concentration is based on the aqueous portion of the pulp slurry. Prior to the addition of sulfoxy compound, the pH of the pulp slurry is adjusted so that the pH of the pulp slurry, after adding sulfoxy compound, will become 5.7–6.7 when dithionite is used, or 5.0–6.5 when metabisulfite or sulfite is used.

The following exemplifies the process:

Four hundred parts of 2.5% consistency spruce groundwood pulp slurry is first warmed to 40° –45° C. Then 2.8 parts of 0.1 copper sulfate (CuSO₄) is added to the pulp and agitated for 5 minutes. The pH is 5.5. Then the pH of the copper ion treated pulp slurry is adjusted to pH 7.5 by adding sodium hydroxide solution. Thereafter, the mixture is transferred to the reactor equipped with a condenser and a stirrer.

The monomer (i.e. methyl methacrylate) is then added to the pulp slurry and agitated to mix pulp and monomer homogeneously. Further, 0.1 part of sodium dithionite of 94% strength determined by the Tappi standard T622 OS-68 is dissolved in 6 parts of 0.1 mol sodium acetate and then added to the reactor. The pH of the total pulp slurry mixture is about 6.5.

With the temperature at 45° –55° C, the mixture is agitated slowly for 60 minutes. All the charged monomers are polymerized; and about 10% homopolymer (latex) based on the charged monomer is generated in the aqueous medium. Then 0.2 parts of calcium chloride is added to the slurry to make the homopolymer precipitate on the pulp.

Lignocellulosic materials are the general class of cellulose substances which include pure cellulose and natural products containing substantial amounts of lignin and extractives. Cotton, regenerated cellulose (viscose rayon), and wood pulps made by chemical, semi-chemical or mechanical methods are very desirable materials. But other fibers or fiberbundles such as hardboard furnish, recycled paper and newsprint pulps, bagase, rice and wheat straw fibers are also permissible.

The consistency of lignocellulosic material in the aqueous medium is determined depending on the mixability of the slurry and economical factors. Long fiber materials such as bleached chemical pulp are more difficult to mix than short fiber materials such as groundwood pulp, hence, the former requires lower consistency than the latter. Of course, the lower the consistency, the easier the mixing, but the more materials and energy are wasted. The range of permissible consistency is about 0.5–6.0%.

The metallic ions in the add-on polymerization initiation system serve as the oxidation accelerator which catalyzes the oxidation of sulfoxy compounds to generate free radical ions. The metallic compounds have to be water-soluble and able to be absorbed by lignocellulosic substances.

The selection of metallic ion species mostly depends on sulfoxy compounds and lignocellulose substrates. Exemplarily, sodium sulfite incorporated with copper (Cu⁺⁺) and iron (Fe⁺⁺, Fe⁺⁺⁺) ions can be used to initiate polymerization of methyl methacrylae (MMA)

onto either bleached chemical pulp or groundwood pulp. Poor polymerization results were obtained when sodium dithionite incorporated with iron ions was used to initiate MMA spruce groundwood pulp. Therefore, the preferred initiation systems are dithionite incorporated with copper ion, and metabisulfite or sulfite incorporated with copper and iron ions. But, for pure cellulose substrates, such as bleached chemical pulp, it is permissible to use initiators such as dithionite, metabisulfite or sulfite incorporated with ions of manganese ($Mn^{++}$), cobalt ($Co^{++}$), lead ($Pb^{++}$) or cerium ($Ce^{++++}$).

Lignocellulose slurry is preferably treated with 0.7-1.5 milli mol/liter concentration of copper or iron based on the water portion of the pulp slurry at pH 5.0-6.0; it is also permissible to use copper or iron concentration's of 0.5-2.5 milli mol/liter with pH 3.0-6.5.

The preferable concentraton of sulfoxy compounds is between 1.5 and 3.0 milli mol/liter in the case of dithionites, or between 2.0 and 2.5 milli mol/liter if metabisulfite or sulfite is used. The permissible concentration is between 1.0 and 3.3 milli mol/liter in the case of dithionites, or between 1.5 and 3.5 milli mol/liter if metabisulfite or sulfite is used. The concentration is based on the aqueous portion of the pulp slurry.

The sulfoxy compounds are very sensitive to the solution pH. They are more stable in alkaline than in acid solution; but, a low pH is required in order to generate radical ions to initiate polymerization of monomer. After the sulfoxy compounds are added to the lignocellulose slurry, the preferred pH is 5.7-6.7 for dithionite and 5.0-6.5 for metabisulfite and sulfite. The permissible pH ranges are 5.0-7.0 for dithionite and 4.5-7.0 for metabisulfite and sulfite.

Thus, exemplarily, 2.5% consistency spruce groundwood pulp slurry with 7.0 milli mol/liter copper sulfate can be preferably adjusted to initial pH 7.2-7.8 or permissibly initial pH 6.5-8.0 before 1.5 milli mol/liter sodium dithionite is added.

The most common and commercially available dithionites are zinc and sodium salts. Other dithionite salts such as aluminum, ammonium, lithium, rubidium, casesium, calcium, strontium, magnesium, barium and lead are permissible.

The dithionites may be in the anhydrous form or an aqueous solution. Dithionite solution can be prepared by adding zinc and iron metallic powder or sodium amalgam to a cold sulfurous acid. Dithionite solution can also be prepared by adding zinc dust to a bisulfite solution.

Metabisulfite and sulfite are the so-called salts of sulfurous acid, an aqueous solution of sulfur dioxide. They can be in aqueous solution or can be in anhydrous form. The most desirable salts are the products of strong bases such as sodium or potassium. Other water soluble salts such as ammonium, magnesium and calcium are also suitable.

Further, of course, it is also suitable that dithionite can be mixed and used with metabisulfite and/or sulfite.

All of the polymerizations were performed with water containing 0.0027-0.0043% oxygen. This amount of oxygen is usually present in water under one atmosphere at 20° -50° C.

The preferred monomers are alkyl esters of methacrylic acid. The methacrylate esters include methyl methacrylate, ethyl methacrylate, n-butyl methacrylate, isobutyl methacrylate, isodecyl methacrylate, tridecyl methacrylate, lauryl methacrylate, and stearyl methacrylate.

Methacrylate esters containing functional groups are permissible. These monomers are, for example, 2-hydroxyethyl methacrylate, hyroxypropyl methacrylate, dimethylaminoethyl methacrylate, t-butyl aminoethyl methacrylate, or glycidyl methacrylate. It has been found that adding a small portion (1-10%) of dimethacrylate monomers, for instance, tetraethylene glycol dimethacrylate, can accelerate the add-on polymerization rate of the alkyl methacrylate.

It is also permissible that styrenic monomers can be polymerized onto wood pulp initiated by metabisulfite or sulfite in cooperation with copper or iron ions at elevated temperature, for example, 80° -90° C. But dithionites are not a good initiator for styrene monomer, because dithionites are decomposed at high temperature (80° C).

It is preferrable that monomers are directly added to lignocellulose slurry and mixed by mechanical agitation. It is also permissible that a monomer-water emulsion is first prepared; and then added to the pulp slurry. The monomer emulsion can be prepared by agitation of monomer and water in presence of an emulsifier.

The temperature of add-on polymerization depends on the sulfoxy compound and monomer species. Dithionite solution is very unstable at elevated temperature. Above 80° C, dithionite tends to decompose immediately, while metabisulfites or sulfites are stable at high temperature. Methacrylate monomers can be polymerized at moderate temperature above 40° C; whereas styrene monomers require temperature above 80° C.

Therefore, methacrylate monomers can be polymerized onto wood pulp initiated by dithionites, metabisulfites or sulfites at moderate temperature, preferably 45° -55° C. The permissible temperature is between 40° -80° C. Only metabisulfites or sulfites can be used to polymerize styrene monomers onto wood pulp, because the elevated temperature of 80° -95° C is required.

Examples that illustrate the invention follow:

EXAMPLE 1

This example illustrates the polymerization of methyl methacrylate (MMA) monomer onto spruce groundwood pulp initiated by sodium dithionite ($Na_2S_2O_4$) and sodium metabisulfite ($Na_2S_2O_5$) incorporated with copper ions.

Fifty parts by weight bone-dry basis spruce groundwood pulp containing 13.1% moisture content was dispersed in 220 parts by weight of 0.9 milli mol/liter copper sulfate ($CuSO_4$) solution by using a blender. The pulp slurry was allowed to stand for 10 minutes at room temperature (25° C). Then, 200 parts by weight 0.1 mol/liter sodium acetate ($CH_3COONa$) and 3 parts by weight of calcium chloride ($CaCl_2$) were added. The pH of the pulp slurry was further adjusted to 7.2 by adding 25 parts by weight 0.3 mol/liter sodium hydroxide.

The pulp suspended solution was then transferred into a three-necked flask equippd with an agitator, a thermometer and a condenser. By slow agitation, 65.7 parts by weight of MMA monomer containing 15 ppm of 4-tert-butyl pyrocatechol was added and heated to 38° C. Then, 0.5 parts by weight of sodium dithionite and 0.3 parts by weight of sodium metabisulfite were added. The temperature was raised to 60° C and kept at that temperature for 40 minutes.

The polymer deposited pulp was filtered and then oven dried (100° C) to 2.9% moisture content. This product had an "add-on" equal to 122.6% polymethyl methacrylate (PMMA) based on the pulp bone-dry weight. Hereafter, this is referred to as percent "add-on." The polymerization efficiency, that is the rate of conversion of MMA monomer to polymer, was 93.3%. Hereafter, this is referred to as "polymerization efficiency."

EXAMPLE 2

This example shows the preparation of polymethyl methacrylate (PMMA) deposited groundwood pulp initiated with sodium dithionite incorporated with copper ion and the physical properties attained by coating a wood particleboard surface.

One hundred parts by weight bone-dry basis spruce groundwood pulp containing 13.1% moisture content were dispersed in 3600 parts of water. Then 12 parts of 0.1 mol/liter copper sulfate ($CuSO_4$) and 12 parts of 0.1 mol/liter copper acetate [$CH_3COO)_2Cu$] were homogeneously mixed with pulp slurry and allowed to stand for 5 minutes. The pH of the pulp slurry was adjusted to 6.9 by adding 0.3 mol/liter sodium hydroxide.

The pulp slurry was then transferred into a three-necked flask equipped with an agitator, a thermometer and a condenser. The pulp slurry was heated to 45° C and 84 parts by weight of methyl methacrylate (MMA) monomer was added followed by adding one part by weight of sodium dithionite dissolved in 50 parts of 0.1 mol/liter sodium acetate ($CH_3COONa$) solution. The mixture was agitated continuously and heated at 50°–57° C for 50 minutes. Then 2 parts by weight of calcium chloride was added and the mixture was agitated for another 10 minutes.

The treated pulp was filtered and oven dried (100° C) to 5.3% moisture content. This product had an "add-on" equal to 76% PMMA based on the bone-dry pulp weight. The polymerization efficiency, that is the rate of conversion of MMA monomer to polymer, was 90.4%.

The 76% PMMA add-on groundwood pulp was used for coating a sanded 5/8 inch thick K-3 particleboard which was a product of MacMillan Bloedel Limited, Vancouver, B.D. An 11 × 11 inch K-3 particleboard was sprayed with 3 grams W108A adhesive, a urea-modified phenol formaldehyde resin which is a product of Borden Chemical (Western) Limited, Vancouver, B.C. Twenty-one grams of the dried PMMA add-on groundwood pulp was first blended to fleece-like fiber by using a blender and then spread on the W108A adhesive sprayed particleboard surface. The assembly was then covered with a chrome-plated caul plate treated with an MA-136 release agent. The release agent was a fluorocarbon type such as tetrafluoroethylene, supplied by Miller-Stephenson Chemical Co. Inc. The total assembly was hot-pressed under the following conditions:

| Temperature | 335° F |
| Pressure | 240 psi |
| Time | 5 minutes |

The hot-press had been cooled down to 275° F before pressure was released. A smooth, glossy and hard surface was produced.

The coated panel was further cut into 4 × 4 inch samples. Two samples were used for an abrasion resistance test, and another two samples for an impact test.

Abrasion resistance was tested by using a Teledyne Taber, Model 503 abrader equipped with a pair of CS-17 calibrase wheels. A 1,000 gram load and 1,000 revolutions were used. Weight loss was determined by the sample weight difference before and after the 1,000 revolutions. The average weight loss of the two tested samples was 85.7 mg per 1,000 cycles; whereas the uncoated K-3 particleboard surface was 392.9 mg per 1,000 cycles.

The impact resistance was tested by using a Model B100 dual impact tster manufactured by the Paul N. Gardner Company. The tester was equipped with a one-inch diameter indentor at a four pound weight loading. The reading was taken from the minimum height from which the coating surface cracked. The average impact strength of the two samples was 52 inch-pounds.

EXAMPLE 3

A number of 100 parts by weight of spruce groundwood pulp samples were treated with methyl methacrylate (MMA) monomer in the manner described in Example2 with the exception that different amounts of MMA monomer were used.

The samples with different amounts of polymer add-on were used for coating sanded five-eighth inch thick K-3 particleboards. The finished panel surfaces were further subjected to abrasion and impact tests. The coating and testing procedures were the same as described in Example 2. The results are shown in Table 1.

TABLE 1

| Example | MMA Parts | PMMA Add-on[a], % | Polymerization Efficiency[b], % | Abrasion Resistance[c], mg/1,000 cycles | Impact Strength[d], inch-pound |
|---|---|---|---|---|---|
| 3 | 105 | 103.0 | 98.1 | 129.7 | 48 |
| 4 | 129 | 116.0 | 89.9 | 97.4 | 48 |
| 5 | 130 | 122.9 | 94.5 | 115.8 | 44 |
| 6 | 144 | 129.4 | 89.9 | 110.4 | 52 |
| 7 | 158 | 148.2 | 93.8 | 107.1 | 56 |

[a]The add-on polymer based on bond-dry weight wood pulp
[b]The add-on polymer based on monomer [c]Tested by using a Teledyne Taber, Model 503, abrader, equipped with CS-17 wheels, 1,000 gram load. Abrasion resistance is expressed by weight loss in mg/1,000 cycles. [d]Tested by using a Dual-range impact tester, Paul N. Gardner Company, Model B100, one inch diameter indentor at four pound weight loading.

EXAMPLE 8

125 parts (by weight) of spruce groundwood pulp was steeped in 5,000 parts (by weight) 0.5 milli mol/liter copper sulphate ($CuSO_4$) solution. The mixture was then agitated vigorously by a blender so that the pulp was disintegrated and became a smooth slurry. The pH of this slurry was adjusted to 7.7 by adding 0.3 mol/liter sodium hydroxide (NaOH) solution. The slurry was heated to 56° C and 75 parts (by weight) of methyl methacrylate (MMA) was added followed by adding 1 part (by weight) of sodium dithionite ($Na_2S_2O_4$) dissolved in 72 parts (by weight) of 0.1 mol/liter sodium acetatre ($CH_3COON_a$) solution.

The mixture was stirred continuously at 53°–55° C. Polymerization was almost complete in 45 minutes, when 1 part (by weight) of calcium chloride was added to precipitate the homopolymers in latex form onto the pulp. Stirring was continued for an additional 15 minutes and the polymerization was complete. After removing the excess water by suction filtration, the MMA-modified pulp was oven-dried and weighed. The pulp increased its weight by 57.2%. The polymerization efficiency, that is the rate of conversion of MMA monomer to polymer, was 95.3%.

EXAMPLES 9–13

Examples 9 to 13 show some variation of MMA/pulp ratios. The pulp slurry consistency in each example was 2.2% in 0.5 milli mol/liter $CuSO_4$ solution, and dithionite added was 1 milli mol/liter. The cooking process was the same as Example 8. The details of reaction condition and the results of polymerization are summarized in Table 2.

TABLE 2

| Example | MMA Parts | Ground wood Pulp Parts | Initial[a] pH | Temperature Range° C | PMMA Add-on[b] % | Polymerization[c] Efficiency % |
|---|---|---|---|---|---|---|
| 9 | 83 | 117 | 7.5 | 47–51 | 68.4 | 96.4 |
| 10 | 90 | 110 | 7.1 | 56–60 | 76.3 | 93.3 |
| 11 | 93 | 103 | 7.5 | 45–50 | 87.4 | 92.8 |
| 12 | 102 | 98 | 7.5 | 50–57 | 99.0 | 95.1 |
| 13 | 107 | 93 | 7.6 | 42–45 | 108.6 | 94.4 |

[a]Pulp slurry pH before adding sodium dithionite
[b]The add-on polymer based on bone-dry weight wood pulp
[c]The add-on polymer based on monomer

EXAMPLE 14

This example shows the water absorption, dimensional stability, and dry and wet tensile strength of the different polymethyl methacrylate (PMMA) add-on groundwood pulp sheets.

The PMMA deposited groundwood pulps made in examples 8–13 were disintegrated by a blender and made to 5 × 5 inch and 11 × 11 inch mats by hand forming in a wooden frame of each size and then hot-pressed into sheets.

For testing thickness and weight changes after 24 hour cold water (25 ± 1° C) soaking, 2 hour boiling and 24 hour 0.5 normal sodium hydroxide solution (25 ± 1° C) soaking, 5 × 5 inch sheets were made by hot-pressing 25 grams PMMA deposited groundwood pulp mats under the following conditions:

| Temperature | 335° F |
|---|---|
| Pressure | 660 psi |
| Pressing time | 5 minutes |

The sheets with an average thickness of 0.05 inch were further cut into 2.5 × 2.5 inch and an average weight of 6 grams.

The boiling treatment consisted of 2 hour boiling at 100° C followed by 1 hour cold water soaking at 25 ± 1° C. The thickness and weight were measured after blotting the surface with a pad of paper towel. The increases of thickness and weight were calculated based on the original specimen thickness and weight.

For dry and wet tensile strength tests, sheets of 11 × 11 inch were made by hot-pressing 30 grams PMMA deposited groundwood pulp mats under the following conditions:

| Temperature | 335° F |
|---|---|
| Pressure | 250 psi |
| Pressing Time | 5 minutes |

The specimens for tensile breaking test were 1 × 5 inch with an average thickness of 0.015 inch. The wet tensile breaking specimens were soaked in distilled water for 24 hour at room temperature (25 ± 1° C) before testing. The tensile breaking was tested by using a TMI Universal Tester, Model 51008, manufactured by Testing Machines, Inc. The distance between the two jaws was 3 inches. The loading speed was 10 seconds to break.

The test results are summarized in Table 3.

TABLE 3

| Sample Made From | 24 hr. Cold Water Soak[a] Thickness Increase % | 24 hr. Cold Water Soak[a] Weight Increase % | 2 hr. Boil[a] Thickness Increase % | 2 hr. Boil[a] Weight Increase % | 24 hr. 0.5N NaOH Soak[a] Thickness Increase % | 24 hr. 0.5N NaOH Soak[a] Weight Increase % | Tensile Strength[b] Dry lbs. | Tensile Strength[b] Wet lbs. |
|---|---|---|---|---|---|---|---|---|
| Example 8 | 13.4 | 14.8 | 32.7 | 39.2 | 27.3 | 36.7 | 44.3 | 18.8 |
| 9 | 12.0 | 13.8 | 31.0 | 38.2 | 23.5 | 25.7 | 36.7 | 20.6 |
| 10 | 11.2 | 14.2 | 25.8 | 36.7 | 20.7 | 25.7 | 34.4 | 17.0 |
| 11 | 10.3 | 11.0 | 19.8 | 23.7 | 19.3 | 23.6 | 47.0 | 17.0 |
| 12 | 6.7 | 7.8 | 17.1 | 20.9 | 16.9 | 19.8 | 38.6 | 15.9 |
| 13 | 6.2 | 8.4 | 17.6 | 17.0 | 14.4 | 14.7 | 31.8 | 18.5 |

[a]Figures for dimensional change are average of five specimens
[b]Figure for tensile breaking test are average of twenty specimens

EXAMPLE 15

This example illustrates the preparation of polyethyl methacrylate (PEMA) deposited bleached softwood kraft pulp initiated with sodium dithionite incorporated with copper ion.

Five parts by weight of bone-dry basis bleached softwood kraft pulp containing 6.2% moisture was dispersed by blending in 150 parts 0.1 mol/liter sodium acetate and 0.8 milli mol/liter copper sulfate solution.

The pulp slurry was then transferred into a glass jar and 6.4 parts by weight of ethyl methacrylate (EMA) monomer and 0.0348 parts of sodium dithionite were added. The jar was then capped tightly; and the mixture was homogenized by hand-shaking. The add-on polymerization was proceeded by soaking in a 60 ± 2° C water bath for 60 minutes with occasional hand-shaking. At the end of polymerization, 0.075 parts of calcium chloride was added to precipitate the homopolymers in latex form onto the pulp.

The PEMA and kraft pulp composite was filtered and dried in an oven (110° C) until a constant weight was obtained. The polymer "add-on" of this sample as 115.5%, based on the bonedry pulp weight. Polymerization efficiency was 90.8%, based on the added monomer.

EXAMPLES 16–18

A number of 5 parts bone-dry basis groundwood pulp and bleached softwood kraft pulp were deposited with ethyl methacrylate (EMA) and butyl methacrylate (BMA) monomers in the same procedure as described in Example 15 with the exception that the samples containing BMA monomer were soaked in a 60 ± 2° C water bath for 70 minutes. The results are summarized in Table 4.

TABLE 4

| Ex. | Pulp[a] | Monomer | Polymer Add-on[b] % | Polymerization Efficiency[c] % |
|---|---|---|---|---|
| 16 | A | Ethyl Methacrylate | 115.9 | 91.1 |
| 17 | A | Butyl Methacrylate | 123.7 | 96.7 |
| 18 | B | Butyl Methacrylate | 124.6 | 97.3 |

[a]Spruce groundwood pulp (A); bleached kraft pulp (B)
[b]The add-on polymer based on bone-dry weight wood pulp
[c]The add-on polymer based on monomer

EXAMPLE 19

One hundred parts by weight bone-dry spruce groundwood pulp containing 13.1% moisture content was dispersed in 4,000 parts by weight of 45° C water containing 0.58 milli mol/liter copper sulfate. After 10 minutes, the pH of the pulp slurry was adjusted to 7.5 by adding 27 parts by weight of 0.3 mol/liter sodium hydroxide.

The pulp slurry was transferred to a three-necked flask equipped with an agitator, a thermometer and a condenser. Then, 65.73 parts by weight of methyl methacrylate (MMA) monomer containing 15 ppm of 4-tert-butyl pyrocatechol was added and mixed with pulp homogeneously by agitation. A sodium dithionite solution prepared by dissolving 0.7 parts by weight of sodium dithionite in 50 parts 0.1 mol/liter sodium acetate solution was added. The pulp slurry was agitated slowly for 50 minutes and the temperature was raised from 45° C to 50° C. Then, 2 parts by weight of calcium chloride was added followed by adding 0.5 parts by weight of red colorant, Irgalite Red CPV paste, supplied by Ciba-Geigy Canada Limited. This product had an "add-on" equal to 60% PMMA based on groundwood pulp weight.

EXAMPLE 20

A plastic sheet was made by hot-pressing a mat of polymethyl methacrylate (PMMA) deposited groundwood pulp. The mat was prepared by a wet foam-forming method.

Two batches of 60% PMMA add-on and red-colored PMMA deposited groundwood pulp were prepared as described in Example 19. The PMMA deposited groundwood pulp slurry of about 4% solid consistency was converted into a foam-like material by vigorous agitation in a blender. The foam-like material was spread in a 4 × 4 foot deckle box having a fiberglass screen bottom.

Another batch of 120% PMMA add-on and red-colored PMMA deposited groundwood pulp was prepared by polymerization of 131.26 parts by weight of MMA monomer onto 100 parts by weight of spruce groundwood pulp by the procedure as described in Example 19. Again, the PMMA deposited groundwood pulp having about 5.5% solid consistency was converted to foam-like material and then spread on the top of the afore-made PMMA deposited groundwood pulp mat. Therefore, the mat consisted of two layers; the top layer contained 120% PMMA add-on and the bottom layer contained 60% PMMA add-on.

The excess water contained in the mat was squeezed out by roller pressing. The densified mat was further dried under infrared lamps and then pressed to a sheet by a 4 × 4 foot hotpress.

The dried mat was placed between two stainless caul plates which had been sprayed with an MS-136 mold release agent supplied by Miller-Stephenson Chemical Co. Inc. The thickness of caul plate was 25 mils. The assembly was hot-pressed at 330° F and 400 psi by an oil-heated hot-press. Before the pressure was released, the platen was cooled down to 285° F in about one hour. A sheet of smooth, glossy and esthetically pleasing appearance was produced.

The hot-pressed PMMA deposited groundwood pulp sheet was further laminated on a half inch thick flakeboard. A 4 × 4 foot flakeboard was spread with 140 grams Wonderbond - 908, a thermosetting vinyl acetate latex, manufactured by Borden Chemical (Western) Limited, then overlaid with the PMMA deposited pulp sheet. Again, the assembly was hot-pressed at 240° F and 175 psi for 8 minutes. An overlaid flakeboard with smooth, hard, glossy and esthetically pleasing surface was obtained.

EXAMPLE 21

In this example polymethyl methacrylate (PMMA) is deposited on groundwood pulp using metabisulfite incorporated with ferric ion.

Five parts by weight of bone-dry basis spruce groundwood pulp containing 14% moisture were dispersed by blending in 140 parts distilled water and 10 parts 0.1 mol/liter sodium acetate solution. Then, 1.5 parts of 0.1 mol/liter ferric chloride solution was added and homogeneously mixed with the pulp slurry. The pH of the ferric treated pulp slurry was 4.9.

The pulp slurry was then transferred into a glass jar and 6.6 parts by weight of methyl methacrylate monomer and 3.5 parts of 0.1 mol/liter sodium metabisulfite solution. The metabisulfite solution was prepared by dissolving sodium metabisulfite in 0.1 mol/liter sodium acetate solution and thoroughly mixed. The add-on polymerization was preceded by soaking in a 60 ± 2° C water bath for 1.5 hours with occasional mixing.

The PMMA and groundwood pulp deposit was filtered and dried in an oven at 110° C until constant weight was obtained. The polymer "add-on" of this sample was 125.1%, based on the bone-dry pulp weight. Polymerization efficiency was 95.1% based on the added monomer.

EXAMPLE 22

In this example polymethyl methacrylate (PMMA) is deposited on groundwood pulp using sulfite incorporated with cupric ion.

Five parts by weight of bone-dry spruce groundwood pulp containing 14% moisture were dispersed by blending in 150 parts 1.0 milli mol/liter cupric sulfate solution.

The pulp slurry was then transfered into a glass jar and 6.6 parts by weight of methyl methacrylate monomer and 4.5 parts of 0.1 mol/liter sodium sulfite were added and thoroughly mixed. The add-on polymerization was preceded by soaking in a 60 ± 2° C water bath for 60 minutes with mixing.

The PMMA and groundwood pulp deposit was filtered and dried in an oven at 100° C until constant weight was obtained.

The polymer "add-on" of this sample was 125.4%, based on the bone-dry pulp weight. Polymerization efficiency was 95.4% based on the added monomer.

EXAMPLE 23

In this example polymethyl methacrylate (PMMA) is deposited on groundwood pulp initiated with sulfite incorporated with ferric ion.

Five parts by weight of bone-dry basis spruce groundwood pulp containing 14% moisture were dispersed by blending in 150 parts 0.67 milli mol/liter ferric chloride solution. The pH of the pulp slurry was then adjusted to 5.6 by adding 0.3 N sodium hydroxide solution.

The pulp slurry was then transferred into a glass jar 6.6 parts by weight of methyl methacrylate monomer and 5 parts of 0.1 mol/liter sodium sulfite were added and thoroughly mixed therewith. The add-on polymerization was preceded by soaking in a 60 ± 2° C water bath for 2 hours with mixing.

The PMMA and groundwood pulp deposit was filtered and dried in an oven at 110° C until constant weight was obtained. The polymer "add-on" of this sample was 127.4%, based on the bone-dry pulp weight. Polymerization efficiency was 96.9% based on the added monomer.

Although many specific examples have been given, variations and modifications can be made within the spirit and scope of the appended claims.

We claim:

1. A process for polymerizing vinyl monomer on lignocellulosic particles including the steps of adding to an aqueous slurry of said lignocellulosic particles and aqueous solution of a salt to deposit metal ions of said salt on the surfaces and sub-surfaces of said lignocellulosic particles, the pH of the salt and slurry mixture being from 3 to 6.5 which is conducive to metal ion absorption, adjusting upwardly the pH of the salt and slurry mixture to one favorable to polymerization, adding a monomer of an alkyl ester of methacrylic acid to the mix with agitation, adding a sulfoxy compound to the mix to react with said metal ions and form free radicals which initiate polymerization of said monomer, and continuing to stir the mix at a sufficiently elevated temperature to accomplish add-on polymerization of the monomer on said lignocellulosic particles.

2. The process of claim 1 wherein the metal ion is $Cu^{++}$ and the sulfoxy compound is sodium dithionite.

3. The process of claim 1 wherein the metal ion is $Cu^{++}$ and the sulfoxy compound is a mixture of sodium dithionite and sodium metabisulfite.

4. The process of claim 1 wherein the metal ion is $Fe^{+++}$ and the sulfoxy compound is sodium metabisulfite.

5. The process of claim 1 wherein the metal ion is $Fe^{+++}$ and the sulfoxy compound is sodium sulfite.

* * * * *

UNITED STATES PATENT AND TRADEMARK OFFICE
CERTIFICATE OF CORRECTION

PATENT NO. : 4,042,728
DATED : August 16, 1977
INVENTOR(S) : Shui Tung Chiu et al It is certified that error appears in the above-identified patent and that said Letters Patent are hereby corrected as shown below:

col. 1, line 37, delete "haken" and insert thereat --baked--;

col. 1, line 42, delete "in" and insert thereat --to--;

col. 2, line 37, delete "cual" and insert thereat --caul--;

col. 5, line 12, delete "from" and insert thereat --form--;

col. 5, line 59, the consistency formulation should read --0.015 - 0.025--;

col. 6, line 18, please add the word --mol-- after the figure "0.1";

col, 7, line 37, delete "7.0" and insert thereat --0.7--;

col. 9, line 57, delete "B.D." and insert thereat --B.C.--;

UNITED STATES PATENT AND TRADEMARK OFFICE
CERTIFICATE OF CORRECTION

PATENT NO. : 4,042,728
DATED : August 16, 1977
INVENTOR(S) : Shui Tung Chiu et al It is certified that error appears in the above-identified patent and that said Letters Patent are hereby corrected as shown below:

col. 10, line 40, after the word "were", please add --smooth, glossy, and hard. The coated particleboard samples were--.

*Signed and Sealed this*

*Twenty-seventh* Day of *December 1977*

[SEAL]

Attest:

RUTH C. MASON
*Attesting Officer*

LUTRELLE F. PARKER
*Acting Commissioner of Patents and Trademarks*